United States Patent [19]

Natansohn et al.

[11] 4,374,008
[45] Feb. 15, 1983

[54] PROCESS FOR SEPARATING TUNGSTEN FROM COINAGE METALS

[75] Inventors: Samuel Natansohn, Sharon; Gary Czupryna, Salem, both of Mass.

[73] Assignee: GTE Laboratories Incorporated, Waltham, Mass.

[21] Appl. No.: 269,192

[22] Filed: Jun. 1, 1981

[51] Int. Cl.³ .......................... C25C 1/08; C25C 1/22
[52] U.S. Cl. .................................. 204/109; 204/112; 75/101 BE
[58] Field of Search ................... 75/101 BE; 204/109, 204/112

[56] References Cited

U.S. PATENT DOCUMENTS 4,278,643  7/1981  Natansohn et al. .................. 423/54
4,287,159  9/1981  Natansohn et al. .................. 423/54

FOREIGN PATENT DOCUMENTS 2025211  12/1971  Fed. Rep. of Germany ...... 204/109

Primary Examiner—R. L. Andrews
Attorney, Agent, or Firm—Jerry F. Janssen

[57] ABSTRACT

A process for cleanly separating coinage metals from alloys of coinage metals and tungsten comprises electrowinning the coinage metal from an electrolyte solution which is contacted with an ion exchange resin to selectively remove the tungsten.

11 Claims, 1 Drawing Figure

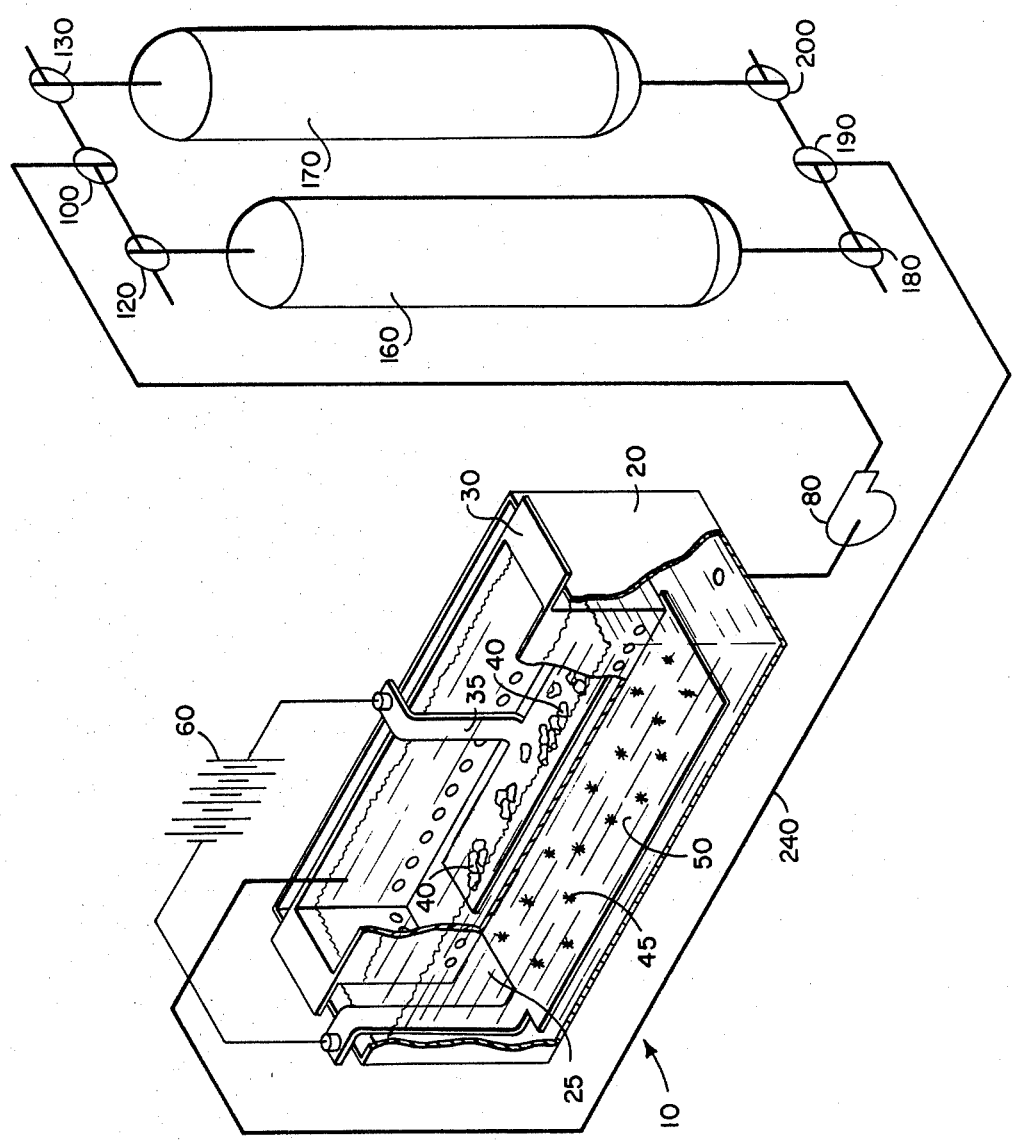

PROCESS FOR SEPARATING TUNGSTEN FROM COINAGE METALS

BACKGROUND OF THE INVENTION

This invention relates to processes for separating metals. More particularly, it is concerned with a process for separating tungsten from the coinage metals, notably silver, during electrowinning.

In the manufacture of electrical switchgear equipment, relays, motor controllers and the like, composites or alloys of tungsten with the coinage metals, especially silver, are used as electrical contact points. Cost considerations dictate that both tungsten and silver be recovered from any scrap generated by the manufacturing process.

It has been the practice in the art to recover silver or other coinage metal from tungsten-containing alloy scrap by conventional electrowinning techniques. A major drawback, however, is the contamination of the coinage metal collected at the cathode of the electrowinning cell with unwanted tungsten inclusion.

SUMMARY OF THE INVENTION

It has been found, however, in accordance with the present invention that silver or other coinage metal can be cleanly separated from tungsten-containing alloys in an electrowinning process which includes continuous or batch extraction of tungsten from the electrolyte by solid-liquid extraction. In accordance with the present invention, a process for separately recovering tungsten and a coinage metal from alloys or mixtures thereof comprises electrowinning the coinage metal from an electrolyte solution contained in an electrowinning cell having an anode, comprising said alloy or mixture of tungsten and a coinage metal, and a cathode. The electrolyte solution is maintained substantially free of dissolved tungsten during the electrowinning process by contacting the electrolyte solution with an anion exchange resin to selectively remove tungsten from the electrolyte solution and to deposit the coinage metal at the cathode of the electrowinning cell in a form substantially free of tungsten contamination.

The coinage metal is recovered from the cathode chamber of the electrowinning cell and the tungsten is subsequently recovered from the anion exchange resin by elution and from the anode chamber of the electrowinning cell. The process of this invention affords a method of cleanly separating tungsten from alloys with the coinage metals, notably silver.

BRIEF DESCRIPTION OF THE DRAWING

The sole drawing FIGURE is a schematic representation of one embodiment of an apparatus employing the process of the present invention.

For a better understanding of the present invention, together with other and further objects, advantages, and capabilities thereof, reference is made to the following disclosure and appended claims in connection with the above-described drawing.

DETAILED DESCRIPTION

Referring to the drawing FIGURE, tungsten-containing coinage metal alloy or other mixture of tungsten and a coinage metal 40 is placed in a permeable basket 30 which forms the anode chamber of an electrowinning cell 10. The pieces of tungsten-containing alloy 40 are placed in contact with an anode plate 35 which rests in the anode chamber basket 30.

A cathode plate 50 rests on the bottom of the electrowinning cell 10 and the entire assembly is filled with electrolyte solution 25. In the embodiment of the present invention wherein silver is separated from silver-tungsten alloy mixtures, the electrolyte solution 25 is preferably saturated aqueous silver nitrate. Anode 35 and cathode 50 are electrically connected to a direct current source 60.

As the process of electrowinning the coinage metal proceeds, crystals of the coinage metal 45 separate from solution and are deposited at cathode plate 50. During this process there is a tendency for small amounts of tungsten to codeposit with the coinage metal crystals at the cathode plate. In the particular case of the separation of silver from silver-tungsten alloys, the concentration of tungsten in the silver crystals deposited at the cathode can often reach levels of 2000 ppm and above. The presence of this undesirable tungsten contaminant in the coinage metal deposited at the cathode in prior art processes required multiple electrowinning steps to obtain a coinage metal of sufficient purity for subsequent use.

In the process in accordance with this invention, contamination of coinage metal deposited at the cathode is minimized by removing the electrolyte solution 25 from electrowinning cell 10 by means of pump 80 or other transfer means, and passing the electrolyte solution through an anion exchange resin to selectively remove tungsten. Employing the method of this invention, the coinage metal deposited at the cathode following the selective removal of tungsten contains less than 50 ppm contaminating tungsten.

As depicted in the drawing FIGURE, the anion exchange resin is contained in columns 160 and 170 shown with appropriate 3-way valving to permit parallel operation of the two columns. Valves 100, 120, 130, 180, 190, and 200 are shown in the drawing FIGURE positioned so as to permit the off-line regeneration of column 170 while column 160 is employed in purifying the electrolyte solution. Although the process is shown in the drawing FIGURE employing a two column system, the invention also contemplates use of a single column operated in a batch mode or a multiple column system operated in a parallel mode, depending on the particular requirements of an application.

Removal of tungsten from the electrolyte solution 25 may be by the batch mode in which the electrolyte is removed from the cell and contacted with the resin when the tungsten concentration in the solution becomes unacceptably high, or by the continuous mode in which the electrolyte solution 25 is continually circulated through the resin column(s) and the cell during the electrowinning of the coinage metal. It has been found that the coinage metal deposited at the cathode tends to become contaminated with unacceptable levels of tungsten even in situations where the tungsten concentration in the electrolyte solution is quite low. For this reason, the continuous mode of the process of this invention is preferred.

The preferred anion exchange resin employed in the process of the present invention is of the gel-type, weakly basic, polyamine functional resin. A commercially available resin of the preferred type is Amberlite IRA 68 ® resin, manufactured by Rohm ad Haas Company, Philadelphia, PA.

Resins of this type have been found to stand up well to the conditions imposed by the process of the present invention and to possess high selectivity for removal of tungsten in the presence of large concentrations of coinage metals such as silver.

In applications where the process is employed to recover tungsten and silver from electrical contact scrap alloy, it is preferred that the resin be converted from the normal free base hydroxyl form or the chloride form to either the nitrate or sulfate form to prevent chemical precipitation of silver on the resin. This is accomplished by repeated washings of the resin with successive portions of 3 M nitric acid or 1.5 M sulfuric acid until the washings indicate the absence of chloride ion.

In either the batch or continuous mode of operation, contacting the electrolyte solution with the anion exchange resin is continued until the resin becomes loaded with tungsten and the efficiency of tungsten extraction drops to a point where tungsten is being returned to the electrowinning cell. At this point, the electrolyte solution is passed through an alternative column of the system, and the tungsten is recovered from the loaded resin column by elution. The loaded column is eluted by first washing with water to remove the small amount of silver or other coinage metal which has been trapped by the resin. Usually, from 1 to 5 bed volumes of water are sufficient to remove most of the coinage metal retained by the column. Following the initial water wash, the column is next eluted with from about 5 to about 20 bed volumes of a dilute aqueous base solution, such as 0.5 M sodium carbonate or 0.5 M sodium hydroxide, to recover the sorbed tungsten metal as a solution of sodium tungstate.

Following recovery of the sorbed tungsten from the resin column, the column is regenerated for continued service in extracting tungsten from the electrolyte solution by washing the column with from about 5 to about 20 bed volumes of dilute nitric acid, typically about 3 M in strength. Following complete recovery of the coinage metal from the tungsten-containing alloy contained in the electrowinning cell, the remaining solid tungsten metal is recovered from the anode basket. The coinage metal deposited at the cathode is recovered from the cathode chamber of the electrowinning cell. In accordance with the present invention, when the method is used to separate silver from silver-tungsten containing alloys, the silver recovered at the cathode has been found to be better than 99.995% pure; that is, containing less than 50 ppm contaminating tungsten.

The following Examples are provided to enable one skilled in the art to practice the invention. It is to be understood, however, that the Examples are intended as illustrations of the present invention and are not to be viewed as limiting the scope of the invention as defined by the appended claims.

EXAMPLE I

One hundred grams of Amberlite IRA-68 ® ion exchange resin (Rohm & Haas Co., Philadelphia, PA) were slurried for two hours with 200 ml of 3 N nitric acid to convert the resin from the free base form to the nitrate form. The resulting mixture was filtered and the residue washed free of acid with water. The moist resin was placed in a 50 ml burette to form a column of about 26 ml volume. The resin column was then washed with 25 bed volumes of water at a flow rate of about 5 ml $min^{-1}cm^{-2}$.

A solution containing 49.3 g/l of silver ion, 10 g/l copper ion and 590 ppm tungsten was next passed through the column at a flow rate of 5 ml $min^{-1}cm^{-2}$. The solution was passed through the column and the effluent analyzed for tungsten and silver content. The data are presented in Table 1 where it can be seen that through 254 bed volumes of solution passed through the column (through fraction 11), the weighted average extraction efficiency for tungsten exceeded 98% while that of silver was less than about 0.1%, demonstrating the high degree of specificity of this resin for extraction of tungsten in the presence of large concentrations of silver.

In fractions 12 through 14, the tungsten extraction efficiency of the column dropped rapidly to about 49.3% indicating the loading of the column with tungsten.

TABLE 1

| Fraction | Volume of Fraction (Bed Volumes) | Cumulative Feed Volume (Bed Volumes) | Tungsten Extraction Efficiency (%) | Silver Extraction Efficiency (%) |
|---|---|---|---|---|
| 1 | 3 | 3 | 99.8 | 1.1 |
| 2 | 30 | 33 | 99.7 | 0.0 |
| 3 | 10 | 43 | 99.5 | 0.5 |
| 4 | 139 | 182 | 99.3 | 0.0 |
| 5 | 10 | 192 | 99.5 | 0.5 |
| 6 | 10 | 202 | 97.6 | 0.0 |
| 7 | 11 | 213 | 91.5 | 0.5 |
| 8 | 10 | 223 | 99.3 | 0.0 |
| 9 | 10 | 233 | 97.5 | 0.0 |
| 10 | 10 | 243 | 99.3 | 0.0 |
| 11 | 11 | 254 | 94.1 | 0.0 |
| 12 | 8 | 262 | 82.2 | 0.0 |
| 13 | 19 | 281 | 63.1 | 1.2 |
| 14 | 10 | 291 | 49.3 | 0.0 |

Example II illustrates the elution and recovery of tungsten from the loaded resin column, and regeneration of the column for further service in extracting tungsten.

EXAMPLE II

The tungsten loaded resin column of Example I was washed with successive portions of water to remove the bulk of any silver retained by the column, and then eluted with successive fractions of 0.5 N NaOH. The data for this Example appear in Table 2 and illustrate that the tungsten is almost quantitatively removed from the column by elution with dilute base while most of the small amount of silver retained by the column is recovered in the initial water wash.

The column was washed with successive portions of 3 N $HNO_3$ and then water following recovery of the tungsten, to regenerate the column.

While there have been shown and described what are at present believed to be the preferred embodiments of the present invention, it will be obvious to those skilled in the art that various changes and modifications may be made therein without departing from the scope of the invention as defined by the appended claims.

TABLE 2

| Fraction | Eluant | Volume of Fraction (Bed Volumes) | Cumulative Eluant Volume (Bed Volumes) | Tungsten Content of Fraction (ppm) | Tungsten Recovered (%) | Silver Content of Fraction (ppm) |
| --- | --- | --- | --- | --- | --- | --- |
| 1 | Water | 2 | 2 | 302 | ND | 24000 |
| 2 | Water | 2 | 4 | ND | — | 34.5 |
| 3 | 0.5 N NaOH | 1 | 5 | 15 | 0.01 | 33.5 |
| 4 | 0.5 N NaOH | 1 | 6 | 2100 | 1.44 | 33.5 |
| 5 | 0.5 N NaOH | 1 | 7 | 14500 | 9.95 | ND |
| 6 | 0.5 N NaOH | 1 | 8 | 31000 | 21.28 | ND |
| 7 | 0.5 N NaOH | 1 | 9 | 38800 | 27.46 | ND |
| 8 | 0.5 N NaOH | 1 | 10 | 38800 | 26.64 | ND |
| 9 | 0.5 N NaOH | 1 | 11 | 10600 | 7.29 | ND |
| 10 | 0.5 N NaOH | 1.5 | 12.5 | 3780 | 3.98 | ND |
| 11 | 0.5 N NaOH | 1.5 | 14 | 1030 | 1.05 | ND |
| 12 | 0.5 N NaOH | 1 | 15 | 1240 | 0.88 | ND |
| 13 | 0.5 N NaOH | 1 | 16 | 5 | 0.003 | ND |
| 14 | Water | 9 | 25 | 1.2 | 0.01 | 0.31 |
| 15 | 3 N HNO$_3$ | 1 | 26 | 3.4 | — | 36.0 |
| 16 | 3 N HNO$_3$ | 3 | 29 | 16 | — | 44.0 |
| 17 | 3 N HNO$_3$ | 5 | 31 | 8.7 | — | 2.0 |
| 18 | 3 N HNO$_3$ | 9 | 40 | 1.1 | — | 0.8 |
| 19 | Water | 5 | 45 | — | — | — |

What is claimed is:

1. A process for separately recovering tungsten and a coinage metal from alloys or mixtures thereof comprising electrowinning said coinage metal from aqueous nitrate electrolyte solution contained in an electrowinning cell having an anode, comprising said alloy or mixture of tungsten and a coinage metal, and a cathode; wherein said electrolyte solution is maintained substantially free of dissolved tungsten by contacting, in a chamber separate from said electrowinning cell, said electrolyte solution with an anion exchange resin to selectively remove tungsten therefrom to deposit said coinage metal at said cathode in a form substantially free of tungsten contamination and separately recovering said selectively removed portion of tungsten from said anion exchange resin.

2. A process in accordance with claim 1 wherein said anion exchange resin comprises a gel type weakly basic polyamine functional anion exchange resin.

3. A process in accordance with claim 2 wherein said anion exchange resin is in the nitrate or sulfate form.

4. A process in accordance with claim 1 wherein said electrolyte solution is removed from said electrowinning cell, contacted with said anion exchange resin, and returned to said cell in a continuous process during the electrowinning of said coinage metal to maintain the tungsten concentration in said electrolyte solution below about 50 parts per million.

5. A process in accordance with claim 4 wherein said coinage metal is silver.

6. A process in accordance with claim 5 wherein said silver deposited at said cathode contains less than 50 parts per million tungsten contamination.

7. A process in accordance with claim 1 further including the step of regenerating said anion exchange resin by contacting said resin, when loaded with tungsten values from said electrolyte solution, with an aqueous solution of sodium carbonate or sodium hydroxide to recover said tungsten values.

8. A process for recovering silver from alloys or other mixtures of silver and tungsten comprising electrowinning silver from an electrolyte solution contained in an electrowinning cell having an anode, comprising said alloy or other mixture of silver and tungsten, and a cathode; wherein said electrolyte solution is maintained substantially free of dissolved tungsten by contacting in a chamber separate from said electrowinning cell, said electrolyte solution with a gel type weakly basic polyamine functional resin to selectively remove tungsten therefrom to deposit said silver at said cathode in a form substantially free of tungsten contamination.

9. A process in accordance with claim 8 wherein said anion exchange resin is in the nitrate or sulfate form.

10. A process in accordance with claim 8 wherein said electrolyte is removed from said electrowinning cell, contacted with said anion exchange resin, and returned to said cell in a continuous process during the electrowinning of said silver to maintain the tungsten concentration in said electrolyte solution below about 50 parts per million.

11. A process in accordance with claim 10 wherein the silver deposited at said cathode is at least 99.995% pure.

* * * * *